United States Patent
Kitao et al.

(10) Patent No.: US 12,395,021 B2
(45) Date of Patent: Aug. 19, 2025

(54) ROTOR AND ROTATING ELECTRICAL MACHINE USING SAME

(71) Applicant: Mitsubishi Electric Corporation, Tokyo (JP)

(72) Inventors: Junji Kitao, Tokyo (JP); Yu Hirai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 255 days.

(21) Appl. No.: 17/921,154

(22) PCT Filed: Mar. 5, 2021

(86) PCT No.: PCT/JP2021/008662
§ 371 (c)(1),
(2) Date: Oct. 25, 2022

(87) PCT Pub. No.: WO2021/261022
PCT Pub. Date: Dec. 30, 2021

(65) Prior Publication Data
US 2023/0179043 A1    Jun. 8, 2023

(30) Foreign Application Priority Data
Jun. 26, 2020   (JP) .................................. 2020-110630

(51) Int. Cl.
*H02K 1/276* (2022.01)
*H02K 21/14* (2006.01)

(52) U.S. Cl.
CPC .................................. *H02K 1/2766* (2013.01)

(58) Field of Classification Search
CPC ...... H02K 1/2766; H02K 21/14; H02K 21/02; H02K 1/27; H02K 1/24

USPC .................................................... 310/156.57
See application file for complete search history.

(56) References Cited

U.S. PATENT DOCUMENTS

| 2020/0228038 A1 | 7/2020 | Takahashi |
| 2020/0244121 A1 | 7/2020 | Takahashi |

FOREIGN PATENT DOCUMENTS

| CN | 109742880 A | | 5/2019 | |
| CN | 109742881 A | * | 5/2019 | |
| DE | 102018206478 A1 | * | 10/2019 | ........... H02K 1/2766 |
| JP | 2003199273 A | * | 7/2003 | |
| JP | 2006217799 A | * | 8/2006 | ........... H02K 1/2766 |

(Continued)

OTHER PUBLICATIONS

International Search Report and Written Opinion mailed on Apr. 20, 2021, received for PCT Application PCT/JP2021/008662 filed on Mar. 5, 2021, 10 pages including English Translation.

Primary Examiner — Jose A Gonzalez Quinones
(74) Attorney, Agent, or Firm — XSENSUS LLP

(57) ABSTRACT

A rotor core includes: a bypass barrier which is a nonmagnetic region provided on the q-axis; a first magnet provided in a region of the rotor core that is closer to the d-axis than the q-axis is; and a second magnet at least a portion of which is provided in a region, of the rotor core, on a radially inner side relative to the first magnet. The second magnet is provided in a region of the rotor core that is closer to the q-axis than the first magnet is. An end point of the second magnet that is closest to the q-axis is located on the radially inner side, in the rotor core, relative to a radially innermost surface which is a surface on a radially innermost side of the bypass barrier.

14 Claims, 10 Drawing Sheets

(56) References Cited

FOREIGN PATENT DOCUMENTS

| | | | |
|---|---|---|---|
| JP | 2016-13046 A | 1/2016 | |
| JP | 2016-116308 A | 6/2016 | |
| JP | 6033425 B2 | 11/2016 | |
| JP | 2017-225277 A | 12/2017 | |
| JP | 2018-153029 A | 9/2018 | |
| JP | 2019-140895 A | 8/2019 | |
| WO | 2014/003730 A1 | 1/2014 | |
| WO | WO-2014003729 * | 1/2014 | |
| WO | WO-2014003729 A1 * | 1/2014 | ............. H02K 1/276 |

* cited by examiner

ROTOR AND ROTATING ELECTRICAL MACHINE USING SAME

CROSS-REFERENCE TO RELATED APPLICATIONS

The present application is based on PCT filing PCT/JP2021/008662, filed Mar. 5, 2021, which claims priority to JP 2020-110630, filed Jun. 26, 2020 the entire contents each are incorporated herein by reference.

TECHNICAL FIELD

The present disclosure relates to: a rotor having permanent magnets; and a rotating electrical machine.

BACKGROUND ART

In a rotor having a structure in which permanent magnets are embedded in a rotor core, if, in order to reduce main magnetic fluxes in the absence of load, the rotor core is formed so as to have a magnetic path for leakage magnetic fluxes closed in the rotor core, the efficiency of the permanent magnet-type rotating electrical machine is improved. Meanwhile, since the rotor core has the magnetic path for leakage magnetic fluxes, the main magnetic fluxes are reduced, and output is reduced.

In view of the above circumstance, a variable magnetic flux-type rotating electrical machine is proposed in which leakage magnetic fluxes that leak to adjacent permanent magnets are controlled by using q-axis current so that magnetic fluxes, from a permanent magnet, that interlink with a coil wound on a stator are controlled (for example, Patent Document 1).

In Patent Document 1, a rotor has one or more permanent magnets each forming a d-axis magnetic path and includes magnetic flux bypass paths each serving as a path to be followed when leakage occurs from at least one of the permanent magnets provided in the rotor to a pole of an adjacent permanent magnet. A magnetic flux inflow portion and a magnetic flux outflow portion of each magnetic flux bypass path are disposed near an air gap between the rotor and the stator.

CITATION LIST

Patent Document

Patent Document 1: WO2014/003730

SUMMARY OF THE INVENTION

Problems to be Solved by the Invention

However, in a configuration in which the magnetic flux inflow portion and the magnetic flux outflow portion of the magnetic flux bypass path are disposed near the air gap between the rotor and the stator, both magnetic fluxes that interlink with the stator and magnetic fluxes that undergo short-circuiting inside the rotor need to be generated within a limited area of a surface of the rotor. In addition, the following problem arises. That is, in order to form magnetic paths for both the magnetic fluxes that interlink with the stator and the magnetic fluxes that undergo short-circuiting inside the rotor within the limited area, the amounts of both types of magnetic fluxes are in a trade-off relationship, and increase in maximum torque leads to reduction in the variable amount of magnet magnetic fluxes.

The present disclosure has been made to solve the above problems, and an object of the present disclosure is to provide: a rotor in which the variable amount of magnet magnetic fluxes can be improved; and a rotating electrical machine using the rotor.

Solution to the Problems

In a rotor and a rotating electrical machine using the rotor according to the present disclosure, if a center of a magnetic pole of a rotor core is defined as a d-axis, and an axis in a direction electrically orthogonal to the d-axis is defined as a q-axis, the rotor core includes: a bypass barrier which is a nonmagnetic region provided on the q-axis; a first magnet provided in a region of the rotor core that is closer to the d-axis than the q-axis is; and a second magnet at least a portion of which is provided in a region, of the rotor core, on a radially inner side relative to the first magnet. The second magnet is provided in a region of the rotor core that is closer to the q-axis than the first magnet is. An end point of the second magnet that is closest to the q-axis is located on the radially inner side, in the rotor core, relative to a radially innermost surface which is a surface on a radially innermost side of the bypass barrier, and a magnetic flux bypass portion serving as a path for magnetic fluxes generated from a stator is provided in an interval in a radial direction between the second magnet and the bypass barrier.

Effect of the Invention

In the rotor and the rotating electrical machine using the rotor according to the present disclosure, the variable amount of magnet magnetic fluxes can be improved.

DESCRIPTION OF EMBODIMENTS

Figure 1:
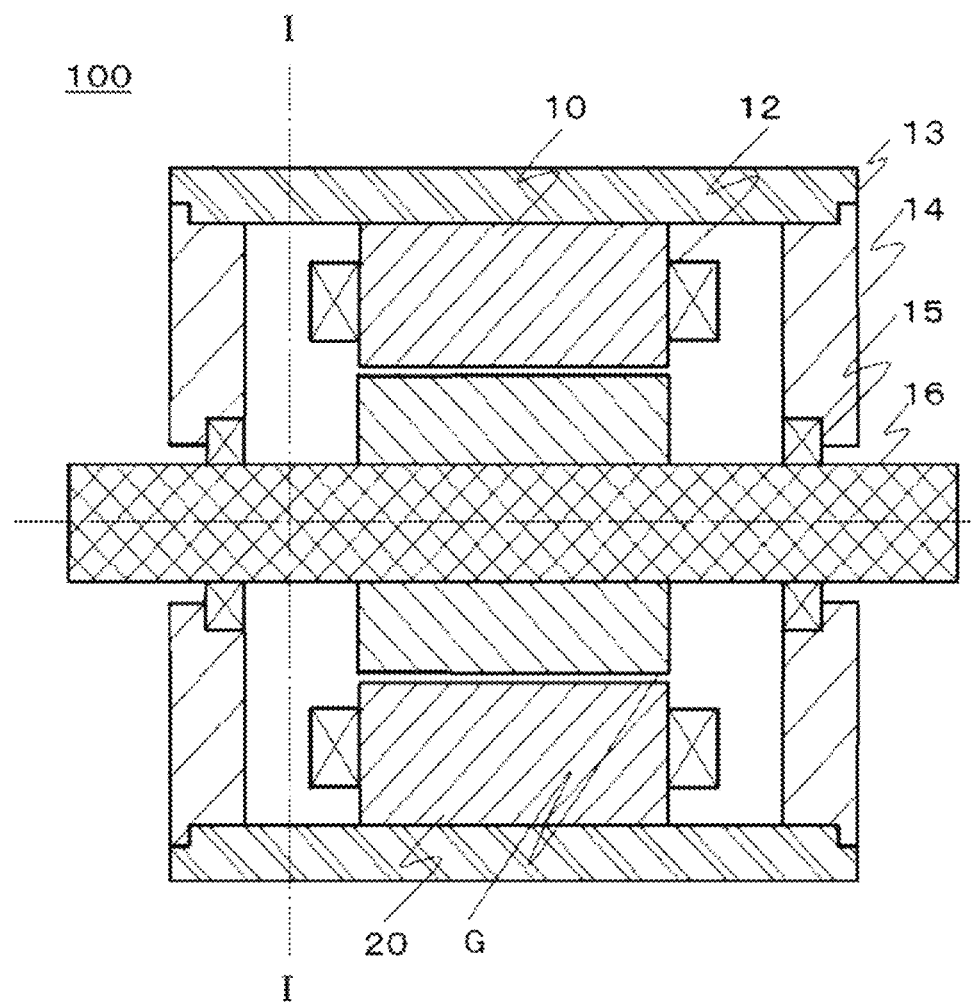
FIG. 1 is a vertical cross-sectional view of a rotating electrical machine including a rotor according to embodiment 1 of the present disclosure.

Hereinafter, embodiments will be described with reference to the drawings. It is noted that the drawings are schematic illustrations, and components are omitted or simplified for convenience of description. In addition, the sizes of and the mutual positional relationship between components and the like respectively shown in different ones of the drawings are not necessarily rendered accurately and can be changed as appropriate. In addition, in descriptions made below, the same components are shown while being denoted by the same reference characters, and names and functions of these components are also regarded as being the same as one another. Therefore, detailed descriptions about these components are sometimes omitted in order to avoid redundancy.

Embodiment 1

Figure 2:
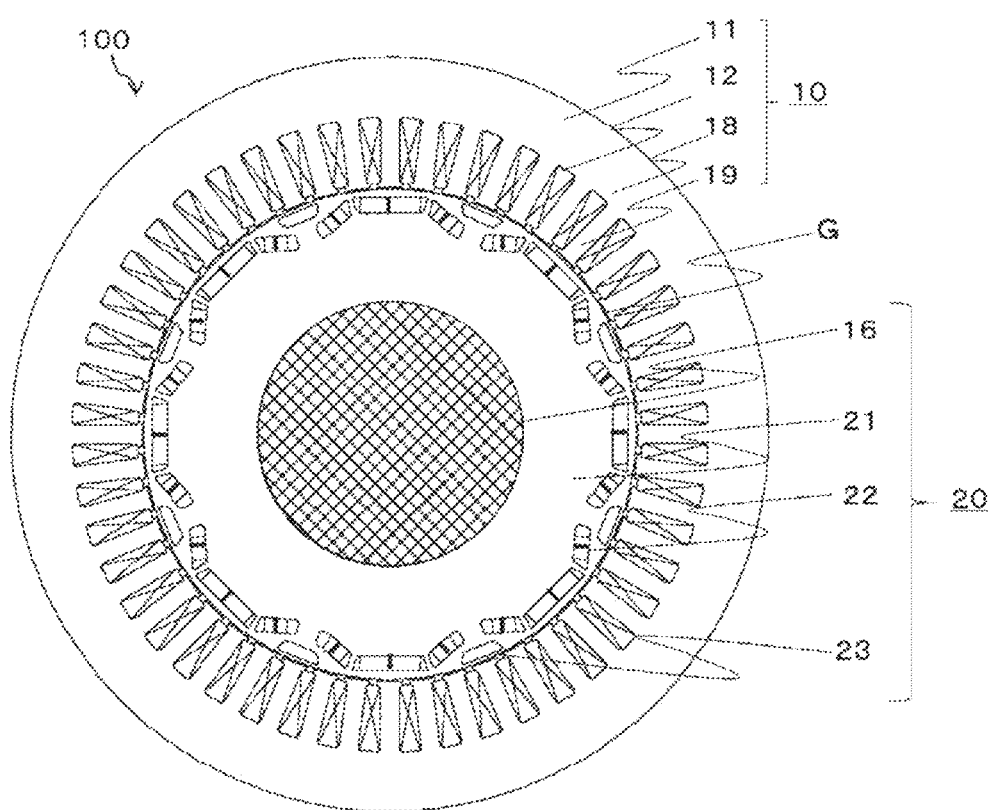
FIG. 2 is a cross-sectional view, taken along a line I-I in FIG. 1, of the rotating electrical machine including the rotor according to embodiment 1 of the present disclosure.

FIG. 1 is a vertical cross-sectional view of a rotating electrical machine including a rotor according to embodiment 1 of the present disclosure. FIG. 2 is a cross-sectional view taken along a line I-I in FIG. 1. It is noted that the vertical cross-sectional view refers to a cross-sectional view showing a cross section including an axial center of a rotation shaft. For convenience, a direction parallel to the axial center of the rotation shaft is defined as an axial direction, a direction having a center at the axial center of the rotation shaft and orthogonal to the axial center of the rotation shaft is defined as a radial direction, and a direction of rotation about the rotation shaft is defined as a circumferential direction.

As shown in FIG. 1, a rotating electrical machine 100 includes: a substantially cylindrical frame 13; a pair of brackets 14 mounted at both ends in the axial direction of the frame 13 so as to close openings on both sides in the axial direction of the frame 13; and a rotation shaft 16 supported by bearings 15, which are mounted to the pair of brackets 14, so as to be rotatably provided in the frame 13. The rotating electrical machine 100 further includes: a rotor 20 fixed to the rotation shaft 16 and rotatably provided in the frame 13; and a stator 10 inserted and held in the frame 13 and coaxially provided on a radially outer side of the rotor 20. A gap G is formed between the rotor 20 and the stator 10. The frame 13, the brackets 14, the bearings 15, and the rotation shaft 16 are components of known technologies, and thus other detailed descriptions about each of these components are omitted.

As shown in FIG. 2, the stator 10 includes: an annular stator core 11; and a stator coil 12 mounted on the stator core 11. The stator core 11 includes an annular core back 18 and a plurality of teeth 19 protruding from the inner circumferential surface of the core back 18 to a radially inner side. The stator core 11 is formed by, for example, stacking and integrating electromagnetic steel sheets in the form of thin sheets in the axial direction. 48 teeth 19 are arranged at equiangular pitches in the circumferential direction. The width in the circumferential direction of a radially innermost portion of each tooth 19 is a circumferential-direction width T. The stator coil 12 is implemented by a distributed-winding coil formed of a conductor wire that is inserted between the teeth 19 and that extends over the plurality of teeth 19. Use of a distributed winding makes it easy to make use of reluctance torque.

The rotor 20 includes: the rotation shaft 16; a cylindrical rotor core 21 having a shaft insertion hole formed at an axial center position thereof; a plurality of permanent magnets 22 (hereinafter, simply referred to as "magnets 22") embedded inside the rotor core 21; and bypass barriers 23 which are nonmagnetic regions. Arrows shown on the magnets 22 in the drawing indicate orientations. The rotor core 21 is fixed to the rotation shaft 16 inserted in the shaft insertion hole. The rotor core 21 is formed by, for example, stacking and integrating electromagnetic steel sheets in the form of thin sheets in the axial direction. As each permanent magnet 22, for example, a neodymium magnet having a high residual magnetic flux density is used.

Figure 3:
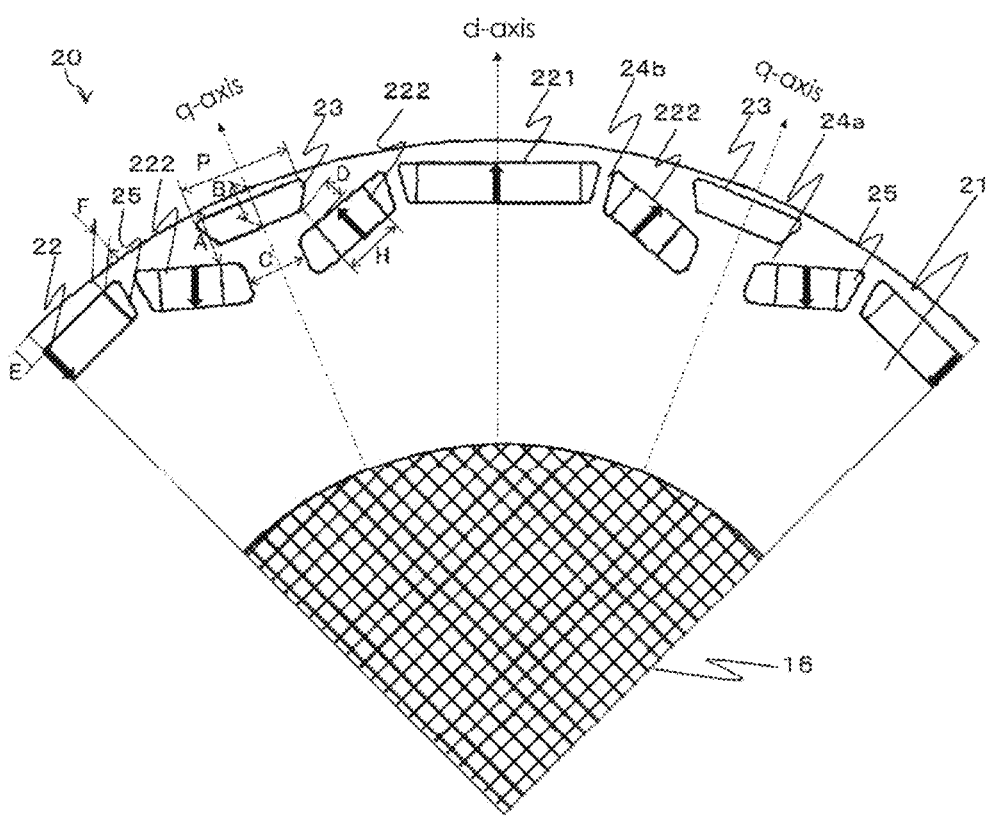
FIG. 3 is a horizontal cross-sectional view of major parts of the rotor according to embodiment 1 of the present disclosure.

A structure of the rotor 20 will be further described with reference to FIG. 3. FIG. 3 is a horizontal cross-sectional view of major parts of the rotor according to embodiment 1 of the present disclosure. It is noted that the horizontal cross-sectional view refers to a cross-sectional view showing a cross section orthogonal to the axial center of the rotation shaft. In regions not shown in FIG. 3, the same components as those in the shown region are continuously formed in the circumferential direction.

Each magnet 22 disposed in the rotor 20 is formed in a rectangular shape, and a flux barrier 25 described later is provided on each short side of the rectangular shape of the magnet 22. Each magnet 22 is either a first magnet 221 or a second magnet 222 described later. Each magnet 22 is magnetized in a direction from one long side to the other long side of the rectangular shape, i.e., a direction parallel to each short side. It is noted that only some of the magnets 22 are denoted by reference characters and the other magnets 22 are not denoted by reference characters in order to prevent complication of the drawing.

As indicated by arrows in the drawing, owing to some magnets 22 that are disposed and magnetized toward the stator 10 side among the magnets 22, an N magnetic pole serving as a path through which magnetic fluxes from the magnets 22 interlink with the stator 10 is formed. In addition, as indicated by arrows in the drawing, owing to some magnets 22 that are magnetized from the stator 10 side toward the rotation shaft 16, S magnetic poles each serving as a path from the stator 10 toward the rotor 20 are formed. Here, the center of the N magnetic pole is defined as a d-axis, and directions electrically orthogonal to the d-axis and each located between magnetic poles which are the N pole and the corresponding S pole, are defined as q-axes. By such magnetization and arrangement, a magnetic path to be generated by each magnet 22 can be formed to be shortest, and thus magnetic fluxes that interlink with the stator 10 can be effectively increased. Consequently, each magnet 22 to be disposed in the rotor 20 can be formed with a minimum magnet amount that is necessary for realizing a desired output from the rotating electrical machine 100.

One magnetic pole of the rotor core 21 is formed by: one first magnet 221 provided so as to straddle the d-axis of the rotor core 21 in the circumferential direction among the plurality of magnets 22; and two second magnets 222 provided in regions of the rotor core 21 that are closer to the q-axes than the first magnet 221 is. This configuration makes it possible to form one magnetic pole as a whole while performing division into: a magnet 22 mainly intended to output magnetic fluxes that interlink with the stator 10; and magnets 22 mainly intended to output magnetic fluxes that undergo short-circuiting in the rotor 20. If the three magnets 22 forming the one magnetic pole are defined as one magnet group, a plurality of the magnet groups are disposed in the rotor core 21 at equal intervals so as to be apart from each other in the circumferential direction. The d-axis which is the center of the N magnetic pole described above is an axis equally dividing the first magnet 221 in the circumferential direction. In addition, each q-axis described above is an axis extending through a portion of the rotor core 21 between adjacent ones of the magnet groups so as to equally divide the portion in the circumferential direction.

The two second magnets 222 of each magnet group forming one magnetic pole are apart from each other with the first magnet 221 interposed therebetween in the circumferential direction and are disposed such that the entirety of the magnet group has the shape of an arc. The arc is formed so as to have a recess portion facing the rotation shaft 16 of the rotor 20. That is, among the three magnets 22 forming the one magnetic pole, the first magnet 221 is disposed in a region, of the rotor core 21, on the radially outer side relative to the other second magnets 222. In each N pole, the first magnet 221 is disposed such that a magnetic flux output surface thereof is closer to a radially outer surface of the rotor core 21 than a magnetic flux output surface of each second magnet 222 is. In each S pole, a magnetic flux input surface of the first magnet 221 is closer to the radially outer surface of the rotor core 21 than a magnetic flux input surface of each second magnet 222 is.

Each second magnet 222 is disposed such that at least a portion thereof is provided in a region, of the rotor core 21, on the radially inner side relative to the first magnet 221. More specifically, the second magnet 222 is disposed such that an end point thereof closest to the corresponding q-axis is located on the radially inner side relative to a radially innermost surface on a radially innermost side of a corresponding one of the bypass barriers 23 described later. In addition, the second magnet 222 is disposed such that, out of both ends thereof in the circumferential direction, an end close to the q-axis is closer to the axial center than an end far from the q-axis is, and the end far from the q-axis is closer to the radially outer surface of the rotor core 21 than the other end is. That is, the magnetic flux output surface of each second magnet 222 is tilted, and the magnetic flux output surface of each second magnet 222 in the N magnetic pole is tilted toward the corresponding q-axis side. The tilt makes it easy for magnetic fluxes from the second magnet 222 to interlink in an intended direction. The tilt is determined such that magnetic fluxes generated from the magnet output surface of the second magnet 222 interlink with another second magnet 222 adjacent thereto with the q-axis interposed therebetween. The magnets 22 forming each S magnetic pole are also disposed in the same manner, and second magnets 222 in different poles adjacent to each other with a q-axis interposed therebetween are disposed in a tilted manner so as to be line-symmetric about the q-axis.

Each magnet 22 has the flux barrier 25 at each of both ends thereof in the circumferential direction. The flux barrier 25 penetrates the rotor core 21 in the axial direction and is a void nonmagnetic region. The flux barrier 25 provided at each of both ends of the first magnet 221 and the flux barrier 25 provided at the corresponding one of both ends of either of the second magnets 222 are adjacent to each other with a portion of the rotor core 21 interposed therebetween. The portion of the rotor core 21 between the first magnet 221 and the second magnet 222 in the same pole adjacent to each other is defined as a bypass portion 24b.

Each bypass barrier 23 is formed on the corresponding q-axis of the rotor core 21. The bypass barrier 23 penetrates the rotor core 21 in the axial direction and is a void nonmagnetic region. The bypass barrier 23 is provided in a region of the rotor core 21 that is enclosed by a radially outermost surface of the rotor and surfaces on the radially outer side of the two second magnets 222 adjacent to each other with the q-axis interposed therebetween. A portion of the rotor core 21 in an interval in the radial direction between the bypass barrier 23 and the second magnets 222 serves as a path through which magnetic fluxes from one second magnet 222 out of the second magnets 222 in the different poles adjacent to each other with the q-axis interposed therebetween passes through the other one of the second magnets 222 so as to undergo short-circuiting inside the rotor core. This path is defined as a bypass portion 24a. A portion of the rotor core 21, on the radially inner side relative to the bypass barrier 23, in an interval in the circumferential direction between the second magnets 222 in the different poles adjacent to each other serves as a path for magnetic fluxes generated by the stator 10. This path is defined as a q-axis magnetic path portion.

Next, the relationship among each magnet 22, the bypass barrier 23, and the flux barrier 25 will be described. As shown in FIG. 3, a distance formed when a radially outermost surface on a radially outermost side of the rotor core 21 and a corner of each second magnet 222 that is closest to the corresponding q-axis are connected to each other parallelly to the q-axis, is defined as a distance A. A distance that is formed when the radially outermost surface of the rotor core 21 and the radially innermost surface on the radially innermost side of the bypass barrier 23 are connected to each other parallelly to the q-axis and that is the longest distance from the radially outer surface of the rotor core 21 to the bypass barrier 23, is defined as a distance B. Here, the distance B is a distance formed when an intersection point between the q-axis and the radially outer surface of the rotor core 21 and an intersection point between the q-axis and the radially innermost surface of the bypass barrier 23 are connected to each other. In this case, the bypass barrier 23 and the second magnet 222 are disposed in the rotor core 21 so as to satisfy a relationship of distance A>distance B.

The shortest distance, on the rotor core 21, in the circumferential direction between the flux barriers 25 provided at the second magnets 222 adjacent to each other with the q-axis interposed therebetween, is defined as a shortest distance C. The shortest distance, on the rotor core 21, in the radial direction between the bypass barrier 23 and each second magnet 222, or the shortest distance, on the rotor core 21, in the radial direction between the bypass barrier 23 and the flux barrier 25 located at an end in the circumferential direction of the second magnet 222, is defined as a minimum distance D. In this case, the flux barrier 25, the second magnet 222, and the bypass barrier 23 are disposed in the rotor core 21 so as to satisfy a relationship of shortest distance C≥minimum distance D×2. The bypass barrier 23 is disposed such that the minimum distance D is longer than the width in the radial direction of a portion of the rotor core 21 on the radially outer side relative to the bypass barrier 23.

Further, the minimum distance, on the rotor core 21, from an intersection point between the d-axis and a radially outermost surface on the radially outermost side of the first magnet 221 to the radially outermost surface of the rotor 20 is defined as a distance E, and the minimum distance, on the rotor core 21, from an end point on the radially outermost side of the first magnet to the radially outer surface of the rotor 20 is defined as a distance F. In this case, the first magnet 221 is disposed in the rotor core 21 so as to satisfy a relationship of distance E>distance F.

The width in the circumferential direction of the second magnet 222 is defined as a circumferential-direction width H. In this case, a relationship of circumferential-direction width H≥shortest distance C×2 is satisfied. Further, if the width in the circumferential direction of a radially outermost portion of the bypass barrier 23 is defined as a circumferential-direction width P, the relationship between the circumferential-direction width P and the circumferential-direction width T of the radially innermost portion of each tooth 19 is expressed as circumferential-direction width P≥circumferential-direction width T.

Figure 4:
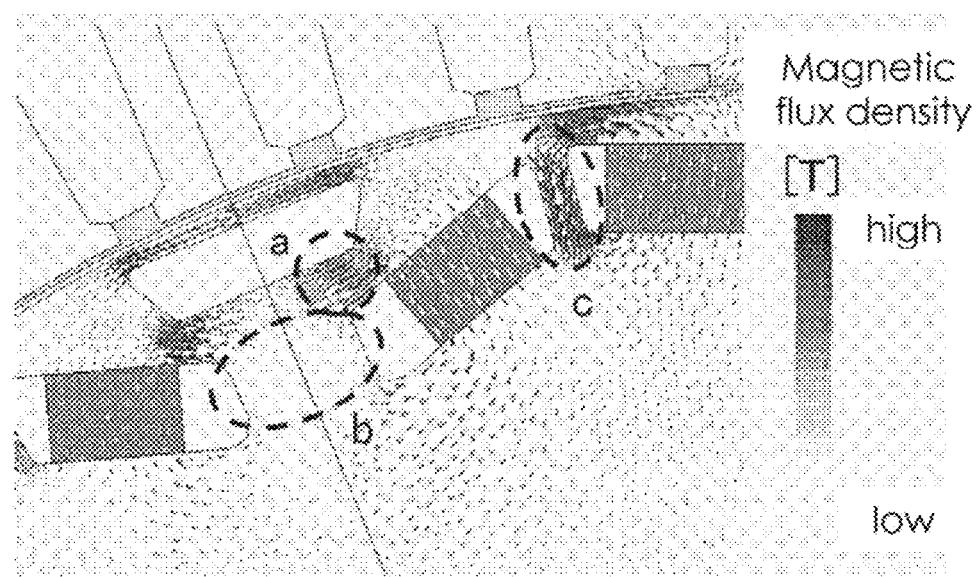
FIG. 4 shows an analysis result of magnetic fields, in the absence of load, of the rotor according to embodiment 1 of the present disclosure.
Figure 5:
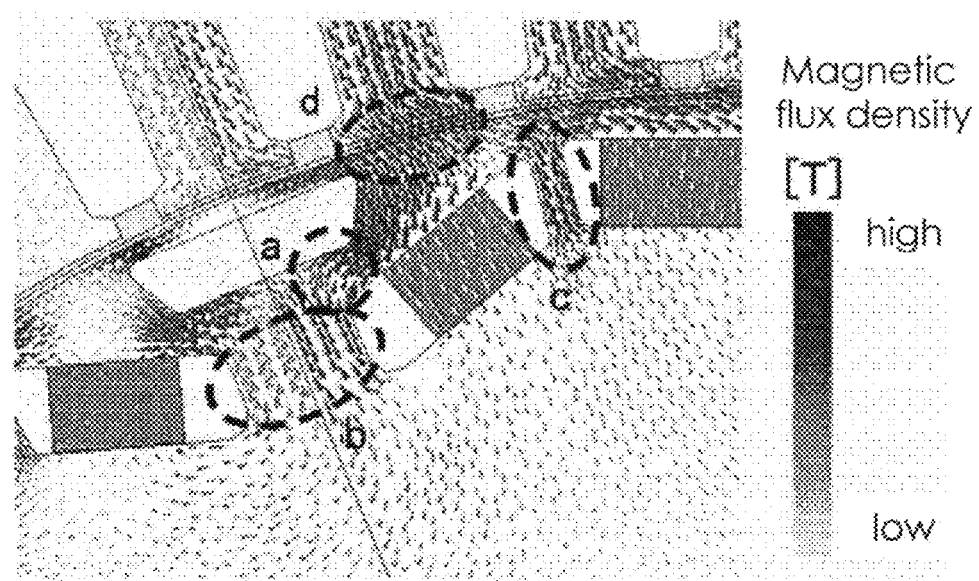
FIG. 5 shows an analysis result of magnetic fields, in the presence of a load, of the rotor according to embodiment 1 of the present disclosure.
Figure 6:
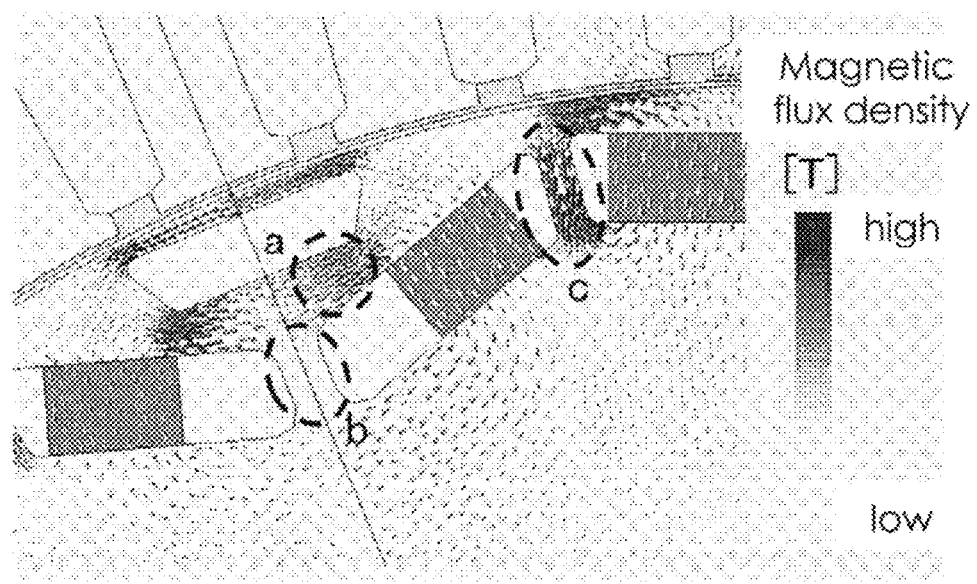
FIG. 6 shows analysis of magnetic fields, in the absence of load, of a modification of the rotor according to embodiment 1 of the present disclosure.
Figure 7:
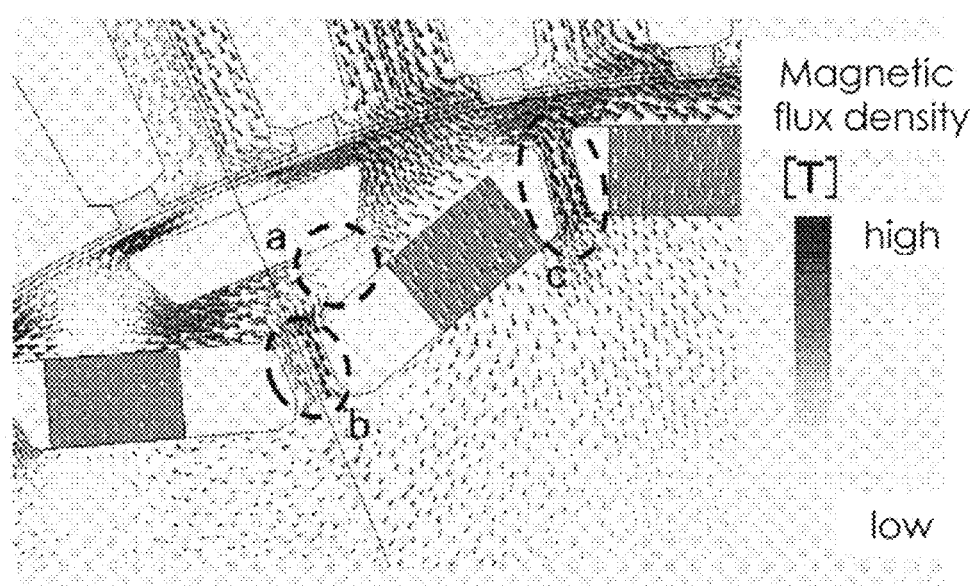
FIG. 7 shows analysis of magnetic fields, in the presence of a load, of a modification of the rotor according to embodiment 1 of the present disclosure.

Here, advantageous effects of the above configuration will be described with reference to FIG. 4 to FIG. 7. FIG. 4 shows a magnetic flux density vector in analysis of magnetic fields, in the absence of load, on the rotor having the shape shown in FIG. 3. FIG. 5 shows a magnetic flux density vector in analysis of magnetic fields, in the presence of a load, on the rotor having the shape shown in FIG. 3. FIG. 6 shows a magnetic flux density vector in analysis of magnetic fields, in the absence of load, on a rotor having a shape with the shortest distance C changed from that of the shape shown in FIG. 4. FIG. 7 shows a magnetic flux density vector in analysis of magnetic fields, in the presence of a load, on the rotor having the shape with the shortest distance C changed from that of the shape shown in FIG. 4. In FIG. 4 to FIG. 7, a range, of the bypass portion 24a in the rotor core 21, that extends over the minimum distance D described above is defined as a major part (a). A range, of the q-axis magnetic path portion in the rotor core 21, that extends over the shortest distance C described above and that is located in the interval in the circumferential direction between the second magnets 222 in the different poles adjacent to each other with the q-axis interposed therebetween, is defined as a major part (b). A range, in the rotor core 21, that includes the bypass portion 24b and that is located in the interval in the circumferential direction between the second magnet 222 and the first magnet 221 in the same pole, is defined as a major part (c).

Regarding the magnetic flux density in the rotor 20 in the absence of load, it is seen that the magnetic flux density at the major part (a) is high as shown in FIG. 4. In addition, it is seen that the magnetic flux density at the major part (b) is low. In addition, it is seen that many of magnetic fluxes generated from the first magnet 221 pass through the major part (c). In other words, many of magnetic fluxes generated from one of the second magnets 222 adjacent to each other with the q-axis interposed therebetween pass through the bypass portion 24a of the rotor core 21, interlink with the other second magnet 222 adjacent thereto, and undergo short-circuiting in the rotor core 21. Some of magnetic fluxes from the first magnet 221 pass through the bypass portion 24b between the first magnet 221 and each second magnet 222 and undergo short-circuiting.

In the presence of a load, the magnetic flux density at the major part (a) and the magnetic flux density at the major part (b) have approximately the same magnitude as shown in FIG. 5. In addition, it is seen that magnetic fluxes generated from the stator 10 when current is conducted through the stator coil 12 of the stator 10, interlink with the major part (b) and the major part (a) of the rotor core 21. Likewise, the magnetic fluxes generated from the stator 10 interlink also with the major part (c).

That is, as described above, the configuration in which the bypass barrier 23 and the second magnet 222 are disposed in the rotor core 21 so as to satisfy the relationship of distance A>distance B particularly enables a path for magnetic fluxes to be ensured at a portion of the rotor core 21 in the interval in the radial direction between the bypass barrier 23 and the second magnet 222. Consequently, magnetic fluxes from the second magnet 222 in the absence of load can be caused to undergo short-circuiting at a portion of the rotor core 21 on the radially inner side relative to the bypass barrier 23 in the rotor core 21. In addition, if the first magnet 221 and the second magnet 222 are disposed so as to be apart from each other in the same pole, the rotor core 21 serving as paths for magnetic fluxes can ensure the paths for magnetic fluxes, and some of magnetic fluxes from the first magnet 221 in the absence of load can be caused to undergo short-circuiting in the rotor core 21. Thus, in the absence of load, magnetic fluxes to undergo short-circuiting in the rotor core 21 are increased, whereby main magnetic fluxes are reduced, and the efficiency of the rotating electrical machine 100 can be improved.

Further, a saturation magnetic flux density obtained when electromagnetic steel sheets are used for the rotor core 21 is about 2 T, and a magnetic flux density, obtained when neodymium magnet is used for the second magnet 222, inside the magnet is about 1 T. Thus, it is necessary to satisfy the relationship of circumferential-direction width H≥shortest distance C×2 in order to maintain magnetic fluxes from the second magnet 222 to undergo short-circuiting over the minimum distance D until the saturation magnetic flux density is attained. By satisfying the relationship of circumferential-direction width H≥shortest distance C×2, the magnetic flux to undergo short-circuiting in the major part (a) of the rotor core 21 can be increased maximally. Thus, in the absence of load, magnetic fluxes to undergo short-circuiting in the rotor core 21 are increased, whereby main magnetic fluxes are reduced, and the efficiency of the rotating electrical machine 100 can be improved.

In addition, the configuration in which arrangement is performed such that the bypass portion 24a is present at a portion of the rotor core 21 in the interval in the radial direction between the bypass barrier 23 and the second magnets 222 enables the bypass portion 24a, which serves as a short-circuit path for magnetic fluxes from the second magnet 222 in the absence of load, to serve mainly as a path for magnetic fluxes generated from the stator 10 in the presence of a load. Consequently, both increase in the amount of short-circuit magnetic fluxes generated inside the rotor 20 and increase in the amount of magnet magnetic fluxes that interlink with the stator 10 can be achieved. Further, as shown at a major part (d) in FIG. 5, the amount of magnetic fluxes that interlink with the stator 10 can be increased by satisfying the relationship of circumferential-direction width P≥circumferential-direction width T.

Next, magnetic flux densities obtained in the rotor 20 when the shortest distance C is set to be shorter than the above shortest distance C shown in FIG. 4, will be described. In the absence of load, the magnetic flux density at the major part (a) is high as shown in FIG. 6. This is because, in the same manner as in the configuration in FIG. 4, many of magnetic fluxes generated from one of the second magnets 222 adjacent to each other with the q-axis interposed therebetween pass through the bypass portion 24a in the rotor core 21 and through the second magnet 222 adjacent thereto in the different pole and undergo short-circuiting in the rotor core 21, and some of magnetic fluxes from the first magnet 221 pass through the portion of the rotor core 21 between the first magnet 221 and each second magnet 222 and undergo short-circuiting. That is, if the relationship of distance A>distance B is satisfied, magnetic fluxes to undergo short-circuiting in the rotor core 21 can be increased, and there is little influence, of shortening of the shortest distance C, on magnetic fluxes from the second magnet 222 in the absence of load.

Meanwhile, as shown in FIG. 7, it is seen that, regarding the magnetic flux density in the rotor 20 in the presence of a load, the magnetic flux density is lower at the major part (a) than at the major part (b). The direction of magnetic fluxes from each second magnet 222 and the direction of magnetic fluxes generated from the stator 10 are factors in the magnetic flux density being lower at the major part (a) than at the major part (b). These directions will be described in detail below.

The magnitude of the magnetic flux density in the presence of a load is determined by superposition of magnetic fluxes generated from the stator 10 and magnetic fluxes generated in the rotor 20. In the major part (a), the direction of magnetic fluxes from the second magnet 222 and the direction of magnetic fluxes generated from the stator 10 are reverse to each other, and, in the major part (b), a change is made from a state where the magnetic flux density is 0 to saturation. For example, if the direction of magnetic fluxes generated from the second magnet 222 is defined as a negative direction, the phenomenon in the major part (a) is changed from magnetic saturation in the negative direction to magnetic saturation in a positive direction. Meanwhile, the phenomenon in the major part (b) is changed from a state where the magnetic flux is 0 to magnetic saturation in the positive direction. Therefore, in the case where the shortest distance C is approximately equal to the minimum distance D as shown in FIG. 7, magnetic saturation occurs more easily in the major part (b) than in the major part (a). When magnetic saturation occurs in the major part (b), less magnetic fluxes interlink with the major part (a) and head for the stator 10 side. The same applies to a case where the shortest distance C is shorter than the minimum distance D.

Therefore, a configuration in which the shortest distance C is longer than the minimum distance D needs to be employed in order to more effectively make use of the rotor core 21 at the major part (a) as a path for magnetic fluxes in the presence of a load. Employment of the configuration in which the shortest distance C is longer than the minimum distance D makes it possible to avoid suppression, due to magnetic saturation in the major part (b), of interlinkage of magnetic fluxes with the major part (a) and makes it possible to more effectively make use of a portion of the rotor core 21 around the major part (a) in the presence of a load.

Figure 8:
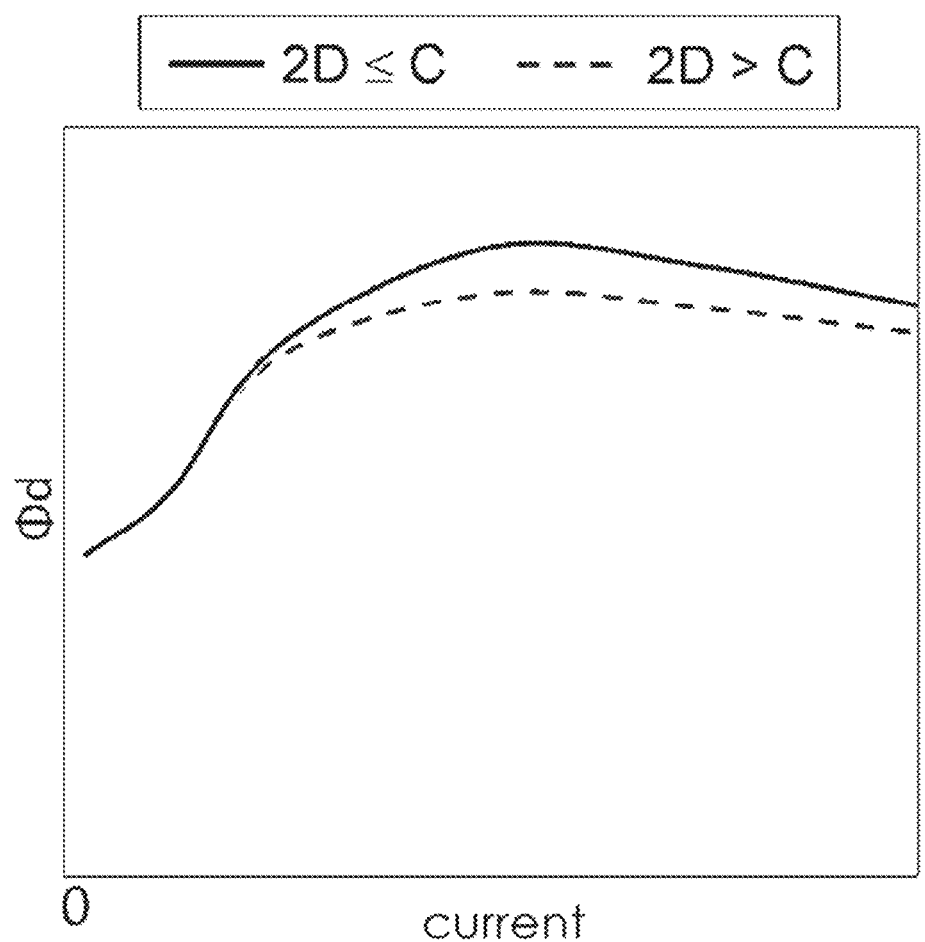
FIG. 8 shows a relationship between current and $\Phi d$ in the rotor according to embodiment 1 of the present disclosure.

The relationship between the shortest distance C and the minimum distance D will be further described with reference to FIG. 8. FIG. 8 shows a result related to $\Phi d$ and obtained when magnetic fluxes that interlink with the stator 10 at the time of current conduction were divided in the d-axial direction and the q-axial direction. In the drawing, the solid line indicates $\Phi d$ in the configuration satisfying the relationship of shortest distance C≥minimum distance D×2 (C≥2D), and the broken line indicates $\Phi d$ in a configuration establishing a relationship of minimum distance D×2>shortest distance C (2D>C).

$\Phi d$ is equivalent to the amount of magnetic fluxes, from each magnet 22 disposed in the rotor 20, that interlink with the stator 10. It is seen that, when current is conducted, the amount of increase in $\Phi d$ is higher in the configuration satisfying the relationship of C≥2D. The amount of increase in $\Phi d$ means the amount of increase in the magnetic fluxes from the magnet 22.

As described above as well, magnetic fluxes that pass through the major part (b) are determined by superposition of magnetic fluxes from the stator 10 and magnetic fluxes from the magnet 22, and $\Phi d$ is formed by this superposition. Therefore, if the bypass barrier 23 is formed on the radially outer side of the rotor core 21 relative to the magnetic flux generation surface of each second magnet 222, and the bypass barrier 23 and the second magnet 222 are disposed so as to satisfy the above relationship of distance A>distance B, a configuration in which superposition of magnetic fluxes occurs in the presence of a load is obtained. Consequently, $\Phi d$ can be increased. Further, a configuration in which each flux barrier 25, the second magnet 222, and the bypass barrier 23 are each disposed in the rotor core 21 so as to satisfy the relationship of C≥2D makes it possible to increase the amount of magnetic fluxes superposed in the major part (a) and the major part (b), and thus, increase $\Phi d$ more. Thus, the maximum torque can be improved.

In addition, it is seen that the magnetic flux density at the major part (c) in FIG. 4 and the magnetic flux density at the major part (c) in FIG. 5 are reverse to each other. That is, the same phenomenon as that in the major part (a) has occurred, and the configuration in which the first magnet 221 and the second magnet 222 are disposed so as to be apart from each other in the same pole makes it possible to increase $\Phi d$ by magnetic fluxes generated from the stator 10.

As described above, in embodiment 1 of the present disclosure, each bypass barrier 23 and the corresponding second magnet 222 disposed on the radially inner side relative to the bypass barrier 23 are provided, and the bypass portion 24a serving as a path for magnetic fluxes is provided at a portion of the rotor core 21 in the interval in the radial direction between the bypass barrier 23 and the second magnet 222. This configuration enables more magnetic fluxes from the second magnet 222 to undergo short-circuiting in the portion of the rotor core 21 on the radially inner side relative to the bypass barrier 23 in the rotor core 21, in the absence of load. Meanwhile, in the presence of a load, the bypass portion 24a can be used as a path for magnetic fluxes from the stator 10. Therefore, both increase in the amount of short-circuit magnetic fluxes generated inside the rotor 20 and increase in the amount of magnet magnetic fluxes that interlink with the stator 10 at the time of current conduction are achieved, whereby the variable amount of magnet magnetic fluxes can be improved.

In addition, arrangement is performed such that the minimum distance D is longer than the width in the radial direction of the portion of the rotor core 21 on the radially outer side relative to the bypass barrier 23. This configuration enables more magnetic fluxes from the second magnet 222 to interlink with the portion on the radially inner side relative to the bypass barrier 23 and enables more magnetic fluxes to undergo short-circuiting in the rotor 20. The end point of the second magnet that is closest to the corresponding q-axis is provided in a region of the rotor core 21 that is located at a magnetic flux inlet/outlet of the bypass portion 24a on the radially inner side relative to the radially innermost surface on the radially innermost side of the bypass barrier 23. This configuration enables more magnetic fluxes to interlink with the portion of the rotor core 21 on the radially inner side relative to the bypass barrier 23. In addition, the variable amount of $\Phi d$ in the presence of a load can be more increased. The magnetic flux input/output surface of the second magnet 222 is tilted with respect to the q-axis. This configuration makes it possible to facilitate interlinkage, in the rotor core 21, of magnetic fluxes with the interval between the adjacent second magnets 222. Further, the second magnets 222 in the different poles are disposed so as to be adjacent to each other with the q-axis interposed therebetween. This configuration leads to flow from one of the second magnets 222 toward the other second magnet 222, whereby more magnetic fluxes can be caused to undergo short-circuiting in the rotor 20 by using the bypass portion 24a as a path.

In addition, one magnetic pole is formed by the plurality of magnets 22. This configuration enables separation into: the first magnet 221 which mainly generates magnetic fluxes that interlink with the stator 10; and the second magnets 222 which mainly generate magnetic fluxes that undergo short-circuiting in the rotor core 21. Consequently, portions of the rotor core 21 between the plurality of magnets 22 can be used as paths for magnetic fluxes. In addition, in the case of forming each magnet 22 in a rectangular shape as well, it is easy to more optimally dispose the magnet 22, and the magnet requires less machining or the like so that manufacturability thereof can be improved. The first magnet 221 is disposed in a region, of the rotor core 21, on the radially outer side relative to the second magnets 222 so as to straddle the d-axis. This configuration enables many of magnetic fluxes from the first magnet 221 to interlink on the stator 10 side at the time of current conduction. Further, by satisfying the relationship of circumferential-direction width P≥circumferential-direction width T, the amount of magnetic fluxes that interlink with the stator 10 can be increased.

In addition, the relationship of circumferential-direction width H≥shortest distance C×2 is satisfied. Consequently, magnetic fluxes that undergo short-circuiting in the rotor core 21 can be increased maximally. Thus, increase in magnetic fluxes to undergo short-circuiting in the rotor core 21 in the absence of load leads to reduction in main magnetic fluxes so that the efficiency of the rotating electrical machine 100 can be improved.

Further, the first magnet 221 on the d-axis is provided so as to satisfy the relationship of distance E>distance F. This configuration causes a reluctance torque to be generated on the gap G side of the rotor core 21 owing to magnetic fluxes from the stator 10. Thus, it is possible to improve the reluctance torque while improving the amount of increase in Φd by the advantageous effect exhibited through separation of the first magnet 221 and each second magnet 222.

Figure 9:
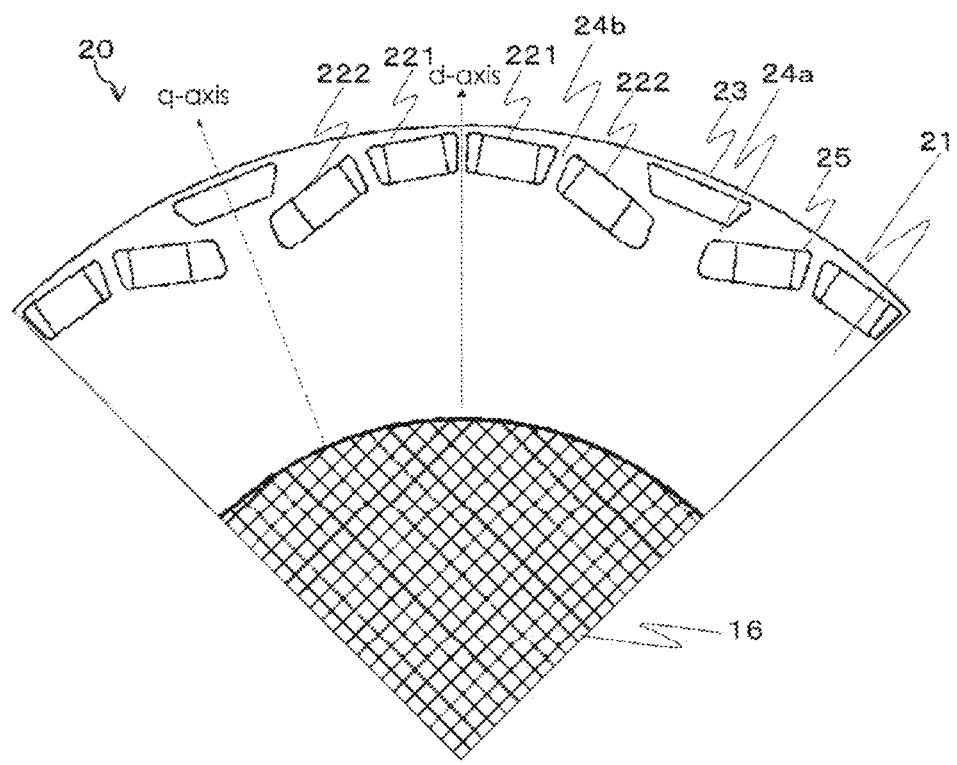
FIG. 9 is a horizontal cross-sectional view of major parts of a rotor according to embodiment 1 of the present disclosure.

Although a configuration in which the first magnet 221 is disposed so as to straddle the d-axis has been described above, the number of the first magnets 221 among the magnets forming the one magnetic pole may be two or more, and the number of the magnets 22 can be changed as appropriate. For example, a configuration in which first magnets 221 are disposed so as to be line-symmetric about the d-axis may be employed as shown in FIG. 9. In this case as well, the advantageous effect of improving the amount of increase in Φd is exhibited, and in addition to this, the advantageous effect of increasing main magnetic fluxes that interlink with the stator 10 is obtained.

In addition, although the shape of each magnet 22 has been described as being a rectangular shape, the magnets 22 may be integrally formed to have an arc shape or may each be formed in a shape that extends on and along an arc. In this case, the advantageous effect of increasing main magnetic fluxes that interlink with the stator 10 and the advantageous effect of improving efficiency by reduction in harmonic of magnetic fluxes generated from the rotor 20, are obtained.

In addition, although each magnet 22 has been described as being magnetized parallelly to each short side thereof, the magnetization does not necessarily have to be performed parallelly to the short side, and may be performed parallelly to each long side thereof or may be changed, as appropriate, to one that is not performed parallelly.

In addition, although a configuration in which the flux barriers 25 are provided at the ends in the circumferential direction of each magnet has been described, the flux barriers 25 do not necessarily need to be provided, and arrangement only has to be performed such that the portions of the rotor core 21 between the magnets 22 satisfy the relationships described above. In this case as well, the advantageous effect of increasing the variable amount of Φd by increase in magnetic fluxes that undergo short-circuiting in the rotor core 21 and the advantageous effect of increasing main magnetic fluxes that are generated from the first magnet 221 and that interlink with the stator 10, are obtained.

In addition, although each bypass barrier 23 and each flux barrier 25 have been described as being void nonmagnetic regions, the bypass barrier 23 and the flux barrier 25 only have to have lower magnetic permeabilities than the rotor core 21 and may be embedded nonmagnetic materials. In this case as well, for example, the magnetic permeabilities can be reduced by deterioration of magnetic properties due to residual stress.

Embodiment 2

Hereinafter, a rotor according to embodiment 2 will be described with reference to the drawing.

Figure 10:
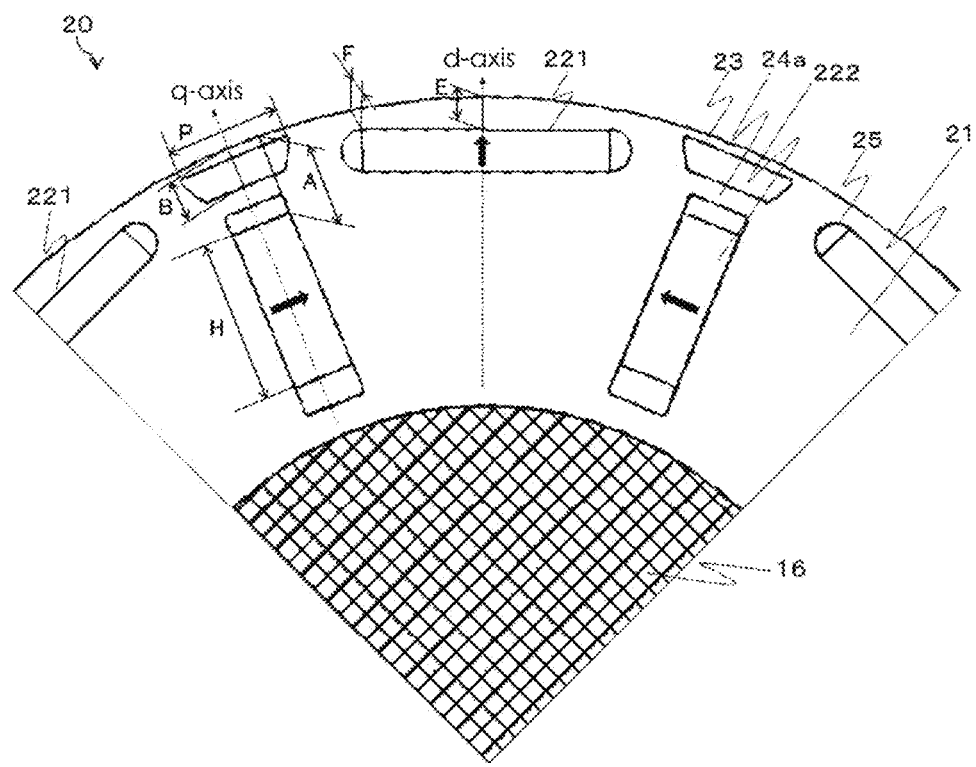
FIG. 10 is a horizontal cross-sectional view of major parts of a rotor according to embodiment 2 of the present disclosure.

FIG. 10 is a horizontal cross-sectional view of major parts of a rotor 20 according to embodiment 2. In the drawing, each second magnet 222 is provided on the corresponding q-axis at a portion of the rotor core 21 on the radially inner side relative to the corresponding bypass barrier 23 provided on the q-axes. In each N magnetic pole, the second magnets 222 are magnetized such that magnetic fluxes from the second magnets 222 head for the stator 10 side as indicated by arrows in the drawing. The second magnets 222 are provided on the q-axes, and thus have opposite magnetization directions in each S magnetic pole. The other components are the same as those in embodiment 1.

Such a configuration also has the same advantageous effects as those in embodiment 1. Since each second magnet 222 is provided on the corresponding q-axis, the distance in the radial direction from the bypass barrier 23 can be made long. Consequently, the number of the magnets can be reduced, and thus it is possible to reduce cost while increasing the variable amount of Φd.

As described above, in the rotor according to embodiment 2, achievement of both increase in the amount of short-circuit magnetic fluxes generated inside the rotor 20 and increase in the amount of magnet magnetic fluxes that interlink with the stator 10 at the time of current conduction leads to exhibition of the advantageous effect of being able to improve the variable amount of the magnet magnetic fluxes in the same manner as in embodiment 1. Further, the reluctance torque can be improved.

Embodiment 3

Hereinafter, a rotor according to embodiment 3 will be described with reference to the drawing.

Figure 11:
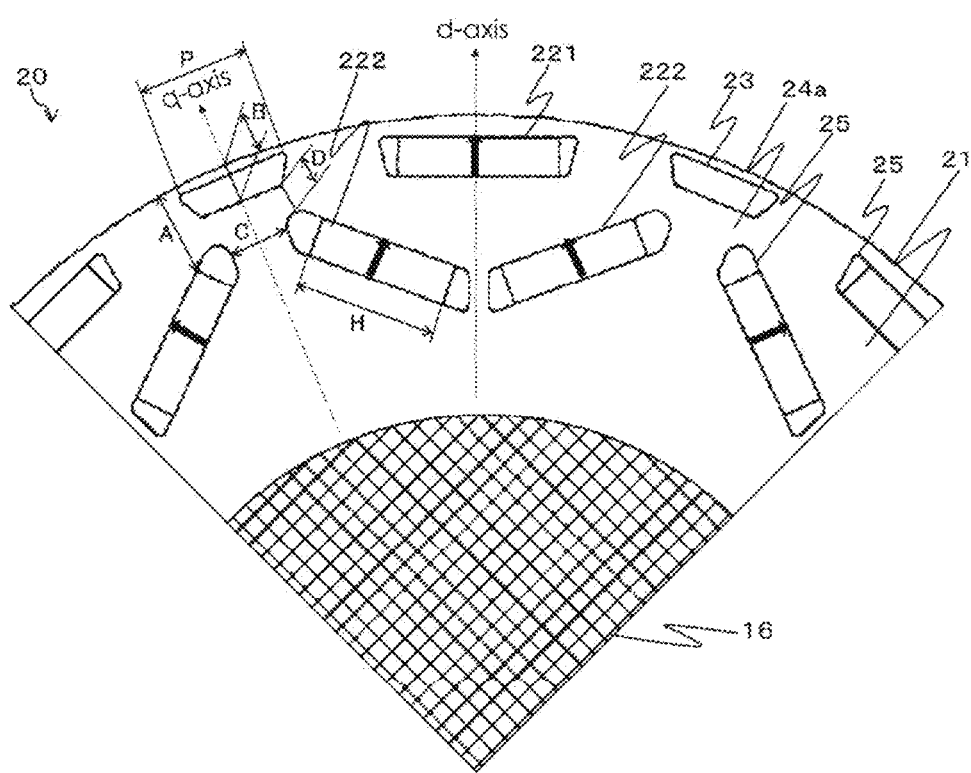
FIG. 11 is a horizontal cross-sectional view of major parts of a rotor according to embodiment 3 of the present disclosure.

FIG. 11 is a horizontal cross-sectional view of major parts of a rotor 20 according to embodiment 3. In the drawing, each second magnet 222 is disposed in a tilted manner such that, out of the ends thereof in the circumferential direction, a radially inner end close to the d-axis is closer to the axial center than a radially inner end close to the corresponding q-axis is. The second magnets 222 in the same pole are disposed so as to be line-symmetric about the d-axis. The second magnets 222 are magnetized such that magnetic fluxes from the second magnets head for the stator 10 side. That is, each magnet 22 in the one magnetic pole is formed as two layers. The other components are the same as those in embodiment 1 or embodiment 2.

Such a configuration also has the same advantageous effects as those in embodiment 1. Since each magnet 22 in the one magnetic pole is formed as two layers, magnetic paths through which magnetic fluxes generated from the stator 10 interlink with the rotor 20 can be increased, whereby the reluctance torque can be improved.

As described above, in the rotor according to embodiment 3, achievement of both increase in the amount of short-circuit magnetic fluxes generated inside the rotor 20 and increase in the amount of magnet magnetic fluxes that interlink with the stator 10 at the time of current conduction leads to exhibition of the advantageous effect of being able to improve the variable amount of magnet magnetic fluxes in the same manner as in embodiment 1 or embodiment 2. Further, the reluctance torque can be improved.

Embodiment 4

Hereinafter, the rotor and a stator according to embodiment 4 will be described with reference to the drawing.

Figure 12:
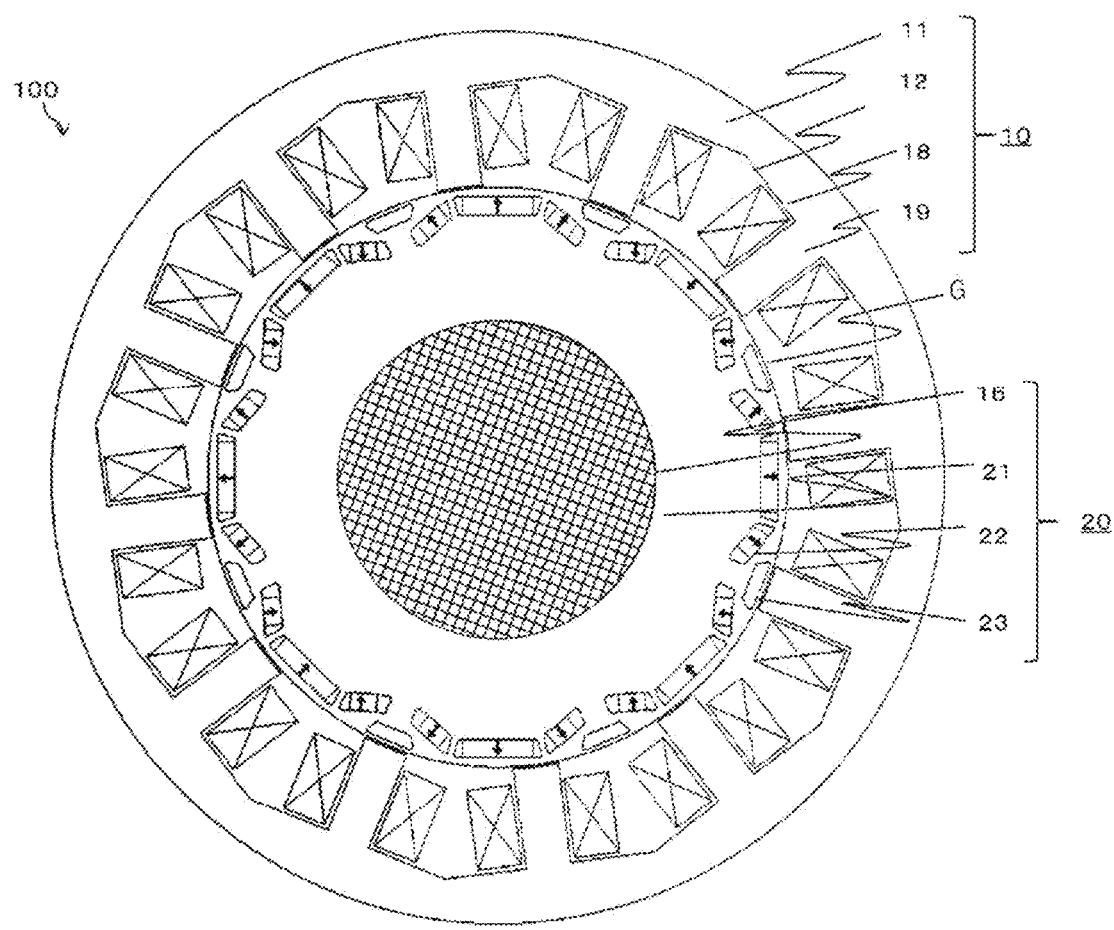
FIG. 12 is a cross-sectional view, taken along the line I-I in FIG. 1, of a rotating electrical machine including the rotor according to embodiment 4 of the present disclosure.

FIG. 12 is a cross-sectional view, taken along a line I-I in FIG. 1, of embodiment 4. A stator 10 includes: an annular stator core 11; and a stator coil 12 mounted on the stator core 11. The stator core 11 includes an annular core back 18 and a plurality of teeth 19 protruding from the inner circumferential surface of the core back 18 to the radially inner side. The stator core 11 is formed by, for example, stacking and integrating electromagnetic steel sheets in the form of thin sheets in the axial direction. 12 teeth 19 are arranged at equiangular pitches in the circumferential direction. The width in the circumferential direction of the radially innermost portion of each tooth 19 is defined as T. The stator coil 12 is implemented by a concentrated-winding coil formed by winding a conductor wire on the teeth 19. The other components are the same as those in embodiments 1 to 3.

In the drawing, if the width in the circumferential direction of the radially outermost portion of the bypass barrier 23 is defined as the circumferential-direction width P, the relationship between the circumferential-direction width P and the circumferential-direction width T of the radially innermost portion of each tooth 19 is expressed as circumferential-direction width P≥circumferential-direction width T.

Such a configuration also has the same advantageous effects as those in embodiment 1. By employing the concentrated winding, a coil end length can be shortened, whereby copper loss can be reduced, and the length of the entirety of a motor can be shortened.

Although 12 teeth 19 arranged at equiangular pitches have been described as the teeth 19, the number thereof does not necessarily have to be 12 and may be changed as appropriate.

As described above, in the rotor according to embodiment 4, achievement of both increase in the amount of short-circuit magnetic fluxes generated inside the rotor 20 and increase in the amount of magnet magnetic fluxes that interlink with the stator 10 at the time of current conduction leads to exhibition of the advantageous effect of being able to improve the variable amount of magnet magnetic fluxes in the same manner as in embodiments 1 to 3. Further, copper loss can be reduced, and the length of the entirety of the motor can be shortened.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the specification of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

10 stator
12 stator coil
13 frame
14 bracket
15 bearing
16 rotation shaft
18 core back
19 tooth
20 rotor
21 rotor core
22 magnet
23 bypass barrier
24a, 24b bypass portion
25 flux barrier
221 first magnet
222 second magnet

The invention claimed is:
1. A rotor comprising:
a rotor core, wherein
if
   a center of a magnetic pole of the rotor core is defined as a d-axis, and
   an axis in a direction electrically orthogonal to the d-axis is defined as a q-axis,
   the rotor core includes
     a bypass barrier which is a nonmagnetic region provided on the q-axis, the bypass barrier having a radially innermost surface which is a surface on a radially innermost side of the bypass barrier,
     a first magnet provided in a region of the rotor core that is closer to the d-axis than the q-axis is, and
     a second magnet at least a portion of which is provided in a region, of the rotor core, on a radially inner side relative to the first magnet,
the first magnet is magnetized in a direction along the d-axis,
the second magnet is provided in a region of the rotor core that is closer to the q-axis than the first magnet is,
the second magnet includes a flux barrier at at least one end thereof,
an end point of the second magnet that is closest to the q-axis is located on the radially inner side, in the rotor core, relative to the radially innermost surface which is the surface on the radially innermost side of the bypass barrier, a magnetic flux bypass portion serving as a path for magnetic fluxes generated from a stator is provided in an interval in a radial direction between the second magnet and the bypass barrier, and a surface of the flux barrier opposes the radially innermost surface of the bypass barrier in the radial direction.

2. The rotor according to claim 1, wherein
the rotor core includes
a plurality of the second magnets provided so as to be adjacent to each other with a q-axis interposed therebetween,
the magnetic flux bypass portion which serves as the path for the magnetic fluxes generated from the stator and which serves as a path for magnetic fluxes, from each second magnet, that pass, from one of the adjacent second magnets, through another one of the adjacent second magnets and undergo short-circuiting inside the rotor core, and
a q-axis magnetic path portion which is a portion of the rotor core on the radially inner side relative to the bypass barrier and which is a portion of the rotor core in an interval in a circumferential direction between the plurality of the adjacent second magnets, and
a shortest distance C which is a shortest distance, of the q-axis magnetic path portion, orthogonal to the q-axis is longer than a minimum distance D which is a minimum distance of the magnetic flux bypass portion.

3. The rotor according to claim 2, wherein
each second magnet includes the flux barrier at both ends thereof in the circumferential direction,
the shortest distance C of the q-axis magnetic path portion is a width of a portion of the rotor core between corresponding ones of the flux barriers that are adjacent to each other with the q-axis interposed therebetween, and
the minimum distance D of the magnetic flux bypass portion is a width of a portion between the bypass barrier and the second magnet or between the bypass barrier and either of the flux barriers.

4. The rotor according to claim 2, wherein the shortest distance C of the q-axis magnetic path portion and the minimum distance D of the magnetic flux bypass portion satisfy a relationship of $C \geq D \times 2$.

5. The rotor according to claim 1, wherein the second magnet is located on the d-axis side relative to a straight line connecting an axial center and an end on the d-axis side of the bypass barrier to each other.

6. The rotor according to claim 1, wherein the second magnet is disposed in a tilted manner such that, out of both ends thereof in a circumferential direction, an end close to the q-axis is closer to an axial center than an end far from the q-axis is, and the end far from the q-axis is closer to a radially outer surface of the rotor core than the other end is.

7. The rotor according to claim 1, wherein the second magnet is provided, on the q-axis of the rotor core, on the radially inner side relative to the radially innermost surface which is the surface on the radially innermost side of the bypass barrier.

8. The rotor according to claim 1, wherein
the rotor core includes a plurality of the second magnets provided so as to be adjacent to each other with the d-axis interposed therebetween, and
the plurality of the second magnets are provided so as to be line-symmetric about the d-axis, each second magnet being tilted such that, out of ends thereof in a circumferential direction, an end on the radially inner side close to the d-axis is closer to an axial center than an end on the radially inner side close to the q-axis is.

9. The rotor according to claim 1, wherein
the first magnet is provided on the d-axis, and
if
a minimum distance from an intersection point between the d-axis and a radially outermost surface on a radially outermost side of the first magnet to an outer circumferential surface of the rotor core is defined as a distance E, and
a minimum distance from an end point on the radially outermost side of the first magnet to the outer circumferential surface of the rotor core is defined as a distance F,
a relationship of E>F is satisfied.

10. The rotor according to claim 1, wherein
the rotor core includes magnet groups, each magnet group including the first magnet and the second magnet and forming one magnetic pole, and
the magnet groups are provided in the rotor core so as to be apart from each other in a circumferential direction.

11. The rotor according to claim 2, wherein
if
a width of the second magnet is defined as H,
a relationship of $H > C \times 2$ is satisfied.

12. The rotor according to claim 1, wherein
a magnetic flux input/output surface of the second magnet is tilted with respect to the q-axis, with the end point of the second magnet that is closest to the q-axis being located on the radially inner side, in the rotor core, relative to the radially innermost surface which is the surface on the radially innermost side of the bypass barrier, and
if
a distance formed when a radially outermost surface on a radially outermost side of the rotor core and a corner of the second magnet that is closest to the q-axis are connected to each other parallelly to the q-axis, is defined as a distance A, and
a distance that is formed when the radially innermost surface on the radially innermost side of the bypass barrier and a radially outermost surface of the rotor core are connected to each other parallelly to the q-axis and that is a longest distance from the radially outer surface of the rotor core to the bypass barrier, is defined as a distance B,
the distance A is longer than the distance B.

13. A rotating electrical machine comprising:
the rotor according to claim 1; and
a stator provided on a radially outer side relative to the rotor with a gap interposed therebetween.

14. The rotating electrical machine according to claim 13, wherein
the stator includes a stator core and a stator coil,
the stator core includes an annular core back and a plurality of teeth protruding from the core back to the radially inner side, and
if
a width in a circumferential direction of a radially innermost portion of each tooth is defined as T, and
a width in the circumferential direction of a radially outermost portion of the bypass barrier which is a nonmagnetic region provided on the q-axis is defined as P,
a relationship of P≥T is satisfied.

* * * * *